Oct. 29, 1968  R. L. FIER  3,408,475
SENSOR FOR A WELDING MACHINE
Filed April 28, 1965  3 Sheets-Sheet 1

INVENTOR
RAYMOND L. FIER
BY Schramm, Kramer, & Sturges
ATTORNEY

Oct. 29, 1968   R. L. FIER   3,408,475
SENSOR FOR A WELDING MACHINE

Filed April 23, 1965   3 Sheets-Sheet 2

INVENTOR
RAYMOND L. FIER
BY Schramm, Kramer & Stenger
ATTORNEY

Oct. 29, 1968  R. L. FIER  3,408,475
SENSOR FOR A WELDING MACHINE
Filed April 23, 1965  3 Sheets-Sheet 3

INVENTOR
RAYMOND L. FIER
BY Schuman, Kramer, & Sturya
ATTORNEY

United States Patent Office 3,408,475
Patented Oct. 29, 1968

3,408,475
SENSOR FOR A WELDING MACHINE
Raymond Louis Fier, Wickliffe, Ohio, assignor to Lewis Welding and Engineering Corporation, a corporation of Ohio
Filed Apr. 28, 1965, Ser. No. 451,584
11 Claims. (Cl. 219—125)

ABSTRACT OF THE DISCLOSURE

There is provided an automatic sensing apparatus for guiding a piece of equipment such as a welder along a predetermined path and which is characterized by a feeler cooperating with apparatus for determining the position of the welding head and also means for controlling the load on the sensing member.

---

This invention relates to an apparatus for guiding a piece of equipment, e.g., a welder, along a predetermined path, such as a joint or seam formed by abutting members.

This invention is particularly suited for automatically controlling the movements of a welding machine, whereby a welding wire fed from a welding head, is guided along a joint or seam. The following description of the invention, therefore, is given in relation to its use with such a machine.

A welding machine essentially comprises a welding head mounted to a movable boom. A wire of welding material is fed from the end or nozzle of the welding head and moved along the seam, welding the pieces together as it moves. The movement of the wire along the seam is controlled by moving the boom. This is especially true when the seam is substantially in a single plane as in the case of welding together sheet goods or flat stock. In cases where the seam follows an arcuate path, it is common practice to rotate the members while keeping the welding head stationary. In either case, variations in the seam necessitate moving the boom to keep the wire in welding relation to the seam.

The boom is normally kept in fixed relation to the seam or joint, that is, above the seam or joint to be welded, as the welding process is more easily observed and controlled. Many machines employed today use mechanical means to control moving the boom. That is, an operator views the welding process and guides the wire along the seam by manually activating motors which move the boom in the desired direction.

This invention automatically controls the movement of the boom and makes obsolete such mechanical means. The machine automatically responds to variations in the seam or joints, and the wire is guided along the joint with unerring accuracy. This is not always true when using a mechanical means, as many times the joint or seam is difficult to observe by the operator, which makes following it extremely difficult.

Briefly stated, this invention is in a sensor which is secured to the boom, and which precedes the wire along the welding path. An arm or guide finger intermediate its extremities, is pivotally mounted to the sensor body and is spring biased against the joint or seam. The arm will move or rotate if any variations in the seam are encountered. It is readily understood that movement in one direction of the end of the arm following the seam causes movement in an opposite direction of the other end of the arm. The movement at the other end of the arm is utilized to activate switches which control motors, which in turn control movement of the boom in the various planes. As the sensor precedes the wire in a predetermined manner, the boom can be moved to accommodate variations in the seam and keep the wire moving therealong.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

The following description is more readily understood by having reference to the annexed drawings, wherein.

Figure 2:
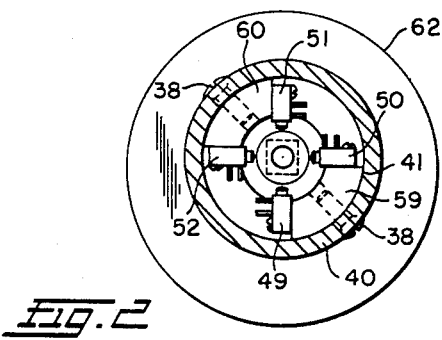
FIG. 2 is a sectional view of the sensor taken in the plane indicated by the line 2—2 of FIG. 1.

Referring generally to FIGS. 1–6 of the annexed drawings and more particularly to FIGS. 1–4, there is shown a sensor, generally indicated at 5. The sensor 5 comprises an elongated cylinder body 6, having a centrally disposed bore 7 longitudinally extending therethrough.

A guide finger or arm 8 extends through the cylinder bore 7. Arm 8 is mounted to the sensor body 6 within the bore 7, for rotational movement in two angularly disposed planes by any suitable means, e.g., a double acting pivot generally indicated at 9. Pivot 9 is located in the bore 7 adjacent one cylinder end 10. An arm follower 11 is removably secured to the arm end 12 extending from the cylinder end 10, by any suitable means, e.g., a set screw 13. The follower 11 is made of any suitable material, e.g., plastic or metal. An actuator 14 made of electrically non-conductive material, e.g., plastic, is removably secured to the other arm end 15 by any suitable means.

It is important that the follower be biased against the seam or joint to be welded. In a normal welding operation the point of welding is in fixed relation to the boom or wire, i.e., the point of welding is below the wire or boom. Therefore, the arm 8 is permanently spring biased in one direction, i.e., in a downward direction against the point of welding. This may be accomplished by any suitable means; for example, a threaded hole 20 is provided in the cylinder wall 21 adjacent the pivotal mounting 9. A spring plunger or bullet catch 22 is threadably engaged in the hole 20 for coaction with the arm 8. A spring biased ball 23 in the plunger 22 exerts force against the arm 8.

A seal generally indicated at 24 is provided at the cylinder end 10 to seal the open end while permitting limited movement of the arm 8. Any suitable sealing means may be used to accomplish this. The bore 7 adjacent end 10 is enlarged to form bore 25. An annular shoulder or abutment 26 is formed between bores 7 and 25. A washer 27 and pliable seal 28, e.g., foamed polystyrene, are successively placed in the bore 25 adjacent shoulder 26. A second washer 29 having substantially the same outside diameter as the cylinder body 6 is placed on cylinder end 10 and holds the pliable seal 28 and washer 27 in place.

A hollow cap 30 is placed on the cylinder end 10, and holds the seal 24 in position by exerting pressure against the washer 29. Cap 30 has a centrally disposed opening 31 in its head 32 adjacent the seal 24. Hole 31 is axially aligned with the holes in the washers 27 and 28. Cap 30 also covers the threaded opening 20 in the sensor body 6. This is done to protect the threaded opening 20 and spring 22. The cap is mounted to the cylinder body 6 and tightened thereon by any suitable means, e.g., screws 33.

An annular recess 34 is formed in the outer surface of the cylindrical body 6 adjacent the open cap end 35. A pliable sealer ring 36 is disposed in the recess 34 for sealing coaction with the cap 30 adjacent its open end 35, when it is in closed position on the cylinder or sensor body 6.

A hollow cap 40 is also used to seal the other end 41 of the sensor body 6. Cap 40 is secured to the sensor body 6 by any suitable means, e.g., set screws 38. A pair of successively larger bores 42 and 43, respectively, are formed inside the hollow cap 40. An annular shoulder or stop 44 is formed between the bores 42 and 43. The shoulder 44 abuts the open end 41 when the cap 40 is placed thereon. A wire receiving space 39 is formed in the top of the cap 40 within the bore 42. A hole or opening 45 centrally disposed in the cap head 46 extends therethrough and communicates with the wire receiving space 39. A male plug or adapter 47 (FIG. 6) is detachbaly secured to the female adapter 37 (FIG. 6) secured in the opening 45. The male adapter 47 is attached to the electrical conduit 48 which leads to motors (not shown) for moving the boom 53.

A plurality of sensing devices or limit switches 49, 50, 51 and 52 are mounted to cylinder end 41 and rest within the cap bore 43. Cylinder end 41 comprises opposing arcuate sections 59 and 60. Limit switches 49 and 50 are mounted to section 59, and switches 51 and 52 are mounted to section 60. When mounted, the limit switches are equally spaced around the cylinder end 41, i.e., 90° apart. Wires (not shown) leading from the female adapter 37 are secured to each limit switch. When the male adapter is secured to the female adapter each limit switch controls the operation of a motor, which in turn operates to move the welding machine's boom 53, in a predetermined manner. Such operation will hereinafter be more fully explained.

Any severe variations in the seam or joint causes extreme rotation of the arm 8, which might injure the limit switches. Therefore, each limit switch is provided with a safety stop. Each safety stop comprises a bolt 54, which is threadably engaged in a passageway 55, in the cylinder walls 21. Screws or bolts 54 extend radially into the bore 7 for coaction with arm 8 to limit movement of the actuator 14 against the respective limit switch.

An annular recess 56 is provided in the outer surface of the cylindrical body 6 adjacent the open end 57 of cap 40. Similarly, a pliable sealing ring 58 is inserted in the recess 56 for sealing coaction with the cap 40 adjacent its open end 57.

Figure 3:
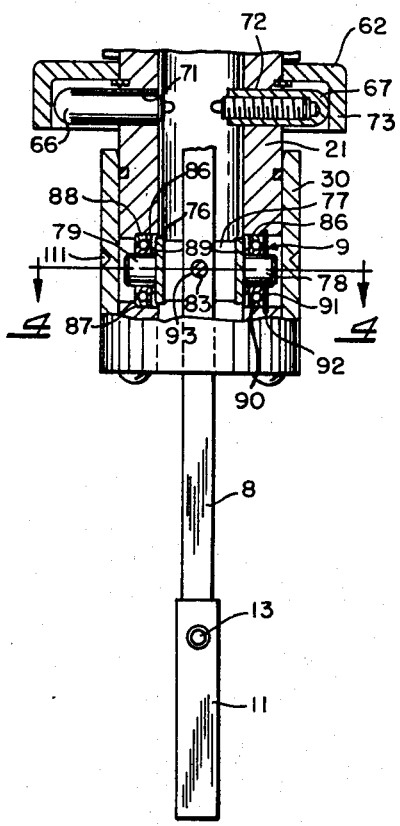
FIG. 3 is a fragmentary sectional view of the sensor taken in the plane indicated by the line 3—3 of FIG. 1 showing the spring biased selector collar and the pivotal mounting for the guide arm or finger.

A selector collar 62 is eccentrically mounted to the cylinder body 6 intermediate caps 30 and 40 (FIG. 2), for rotation therearound. Collar 62 has a web portion 63 which is mounted for rotation between cap end 57 and a snap ring 64 secured in, and extending from, an annular recess 65 formed in the outer surface of the cylindrical body 6. The eccentrically mounted collar 62 is designed to alternately force opposing spring plungers 66 and 67 (FIG. 3) into the bore 7, whereby they exert force against the lever arm or finger 8. The force applied by springs 66 and 67 on arm 8 is normal to the force exerted thereon by spring plunger 20. As previously indicated, the spring 20 is set to bias arm 8 in one direction, i.e., away from the boom towards the point of welding. Springs 66 and 67 are used to bias the arm in a direction normal to this direction. For example, where two abutting pieces 68 and 69 (FIG. 5) form a shoulder 70 which is to be welded, it is desirable to spring bias the follower 11 against the surface 74 of piece 68, and against the shoulder 70. Thus, any variations in shoulder 70 will cause follower 11 to move in the direction of the variations. Arm end 15 moves in the opposing direction making contact with the respective limit switch effecting its closing which causes the respective motor to operate moving the boom in the desired direction. Similarly movement of arm 8 caused by variations in the surface 74 is effected by springs 66 and 67. As seen in FIG. 3, the collar 62 is in position to exert force against spring 67. If the collar 62 is rotated 180°, it will exert force against spring 66 and the force against spring 67 will be relieved. Springs 66 and 67 are disposed in passageways 71 and 72, respectively, in the cylinder walls 21. The annular flange 73 of collar 62 covers the springs 66 and 67 and alternately exerts force thereagainst.

Figure 4:
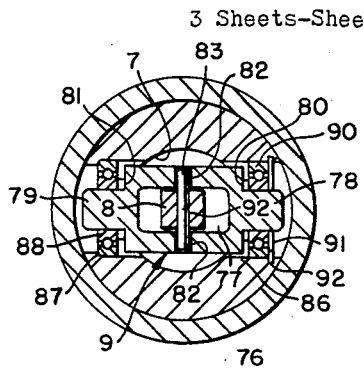
FIG. 4 is a sectional view of the sensor taken in the plane indicated by the line 4—4 of FIG. 3 showing in greater detail the pivotal mounting of the guide arm.
Figure 1:
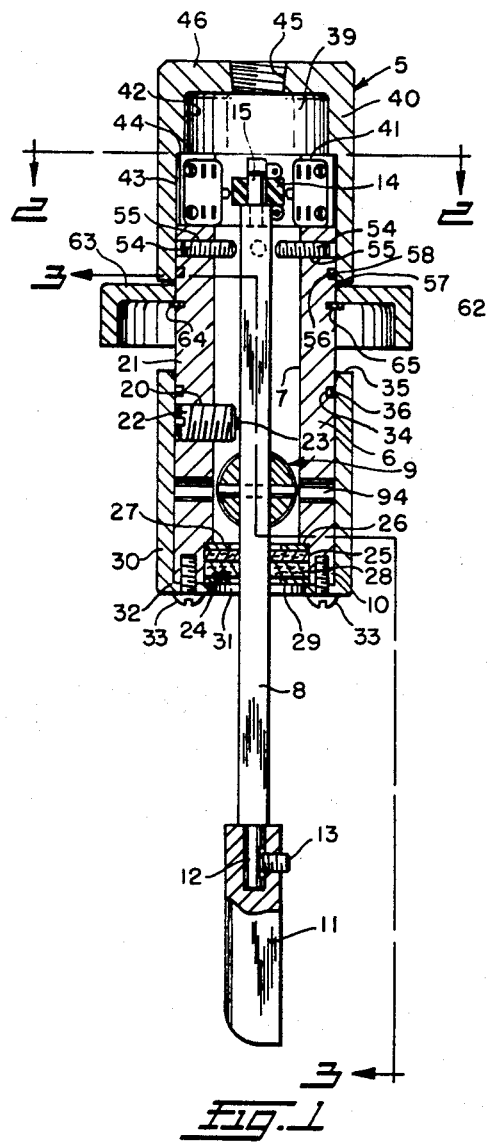
FIG. 1 is a cross-sectional view of the sensor of this invention.

As previously indicated, any suitable pivot means 9 which permits rotation of the arm 8 in two planes may be provided. Referring particularly to FIGS. 3 and 4, the pivotal mounting 9 comprises an enlarged cylindrical portion 76 having a longitudinal slot 77 extending therethrough. Pivot pins 78 and 79 are secured to cylinder ends 80 and 81, respectively, and extend therefrom. Pivot pins 78 and 79 are axially aligned with the cylindrical portion 76.

A hole 82 having its axis in the plane of the pin and cylindrical axes but at right angles thereto is formed in the enlarged cylindrical portion 76 and extends therethrough. Hole 82 is designed to receive a pivot pin 83. The cylinder 76 is mounted for rotation within an enlarged hole or opening 86 formed in the sensor body 6. The axes of the opening 86 and cylindrical portion 76 coincide. An annular shoulder 87 is formed at one end of the opening 86 adjacent the outer surface of the sensor body 6. The longitudinal axis of opening 86 is parallel to and lies in the same plane as the axis of springs 66 and 67, respectively, or spring 20. The reason for this will become apparent as the description proceeds. Any suitable bearing, e.g., ball bearing 88 is mounted in the opening 86 adjacent the annular shoulder 87. A spacer, e.g., washers 89, are placed on each pivot pin 78 and 79, respectively and abut cylindrical portion 76. Pivot pin 79 is then placed within ball bearing 88. A second bearing, e.g., ball bearing 90, is placed on pivot pin 78 and mounted in opening 86 by any suitable means. For example, the bearings and cylindrical portions are kept within the opening 86 by a snap ring 91, which is inserted in an annular recess 92 adjacent the opposite outer surface of the sensor body 6.

The finger 8 passes through and is mounted within slot 77 by passing the pivot pin 83 through aligned holes 93 and 82 formed in the finger 8 and portion 76, respectively. To facilitate passing the pin 83 through the passageway 82, an axially aligned hole 94 (FIG. 1) is disposed in the cylinder body 6. Thus, the finger or arm 8 is mounted within the body 6 for rotation in two directions which are at right angles to each other. For example, arm 8 is mounted for rotation to and from springs 66 and 67, respectively, and limit switches 49 and 51, respectively. In the same embodiment, arm 8 is also mounted for rotation to and from spring 20 and limit switches 52 and 50, respectively. In the embodiment shown, four limit switches are provided which control movement of the boom in four directions. It should be understood that a plurality of circumferentially spaced limit switches could be provided depending upon the number of movements of the boom. In accordance therewith, the arm 8 would be mounted to the sensor body 6 for rotation in a plurality of directions.

Figure 5:
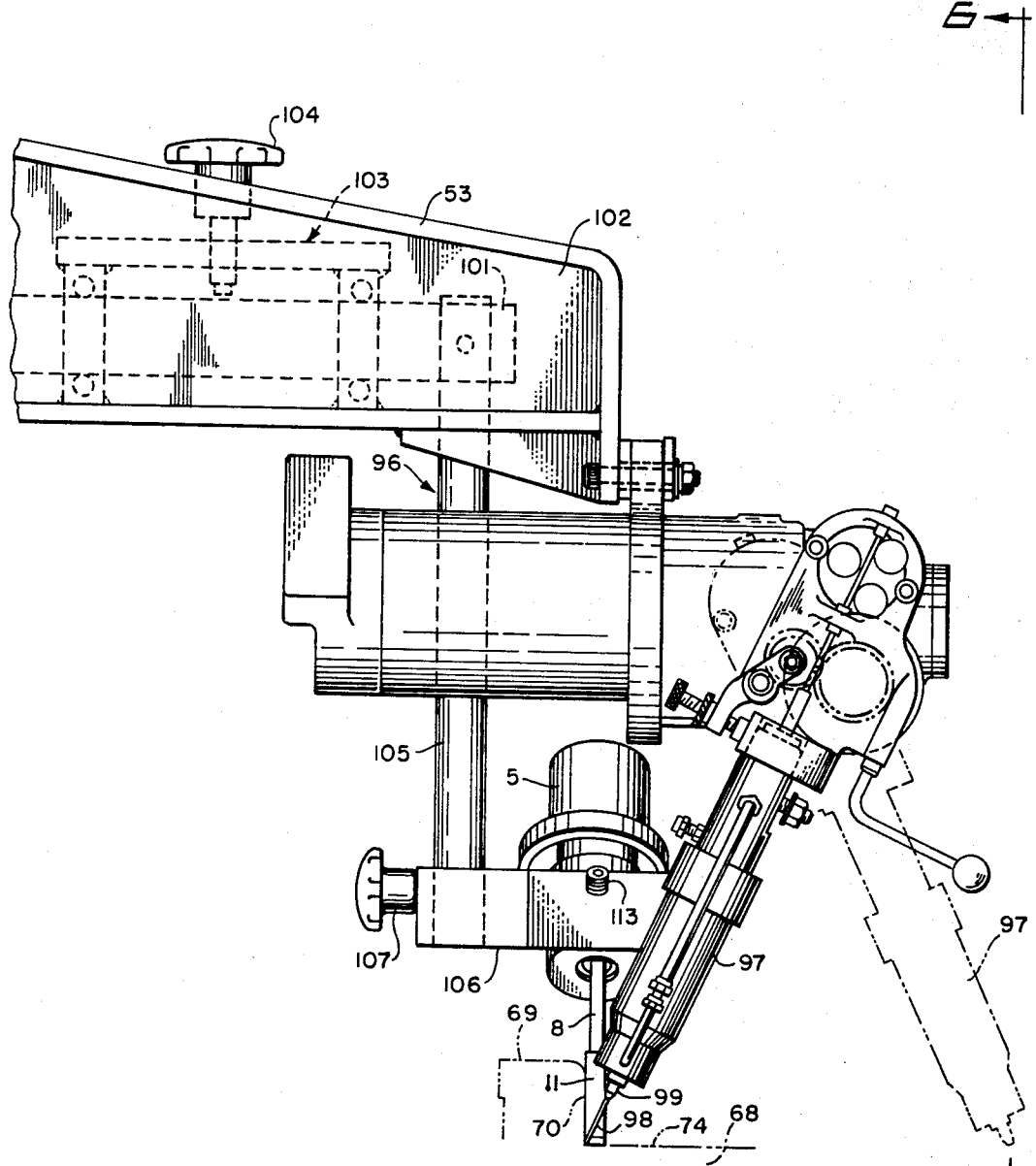
FIG. 5 is a perspective view of the sensor in conjunction with the tip of a welding machine boom and welding head.
Figure 6:
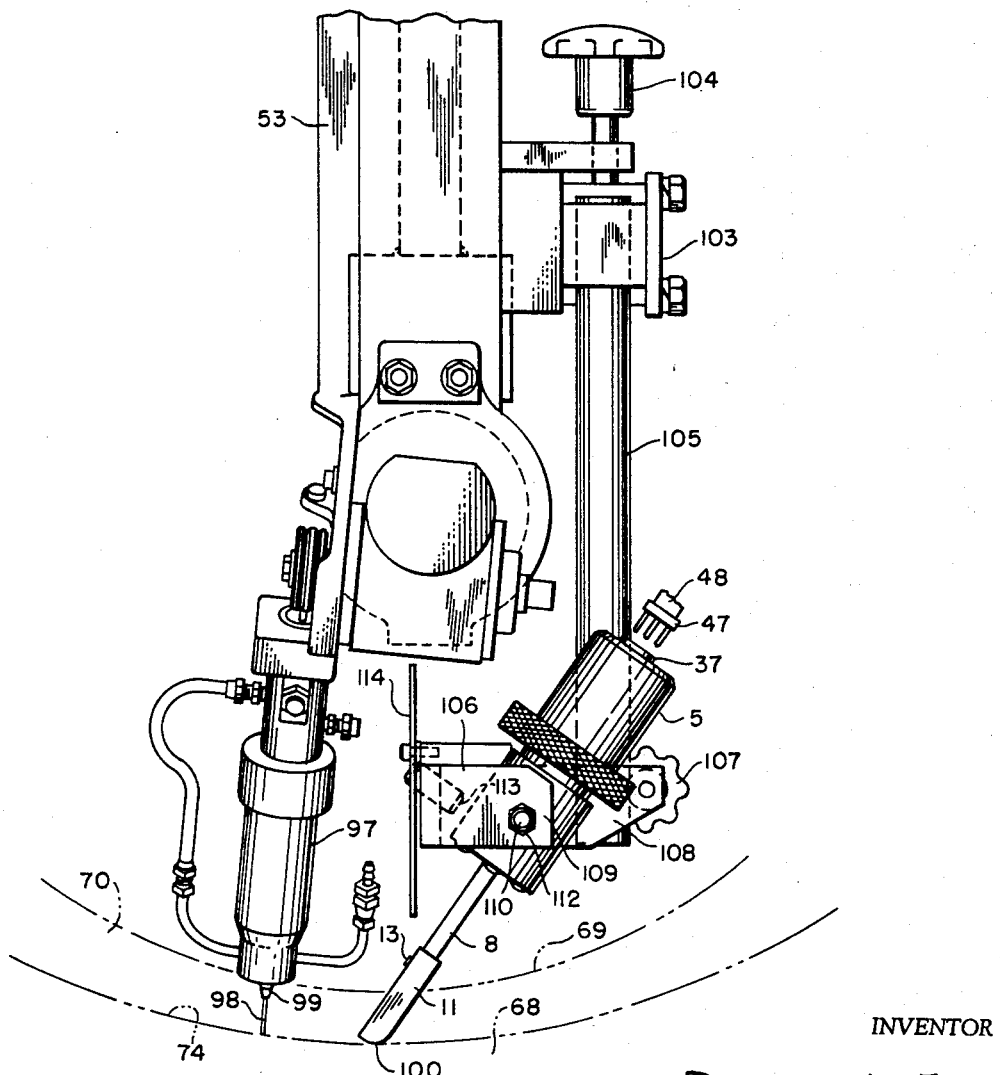
FIG. 6 is another perspective view of the sensor in conjunction with the boom tip and welding head.

Referring more particularly to FIGS. 5 and 6 of the annexed drawings, there is illustrated a sensor 5 used in conjunction with a welding head 97, which is mounted to a welding machine's boom 53. The welding head 97 is mounted to the boom 53 and is in welding relation to the joint formed between the abutting cylindrical portions 68 and 69. A welding wire 98 extends from the nozzle 99 of the welding head 97, and is fed to the head 97 by any suitable means (not shown). The sensor 5 is mounted to the boom 53 by any suitable means, e.g. mounting 96. The tip 100 of the follower 11 precedes the wire 98 along the welding path, i.e., the seam or joint between the surface 74 and shoulder 70.

The sensor mounting 96 comprises an elongated bar 101 slidably mounted to the boom end 102 by any suitable means, e.g. bar mounting 103. The bar 101 preferably has a rectangular cross section. The bar 101 is adjustable within the mounting 103 by a clamp or tightening knob 104. A second bar 105 is secured to the bar 101 and extends therefrom in a direction away from the boom 53 towards the welding head 97. The bar 105 is preferably at right angles to bar 101.

A U-shaped sensor holder 106 is slidably mounted on the bar 105 and is adjustable therealong. Holder 106 is clamped to bar 105 by any suitable means, e.g., a knob or screw 107.

The sensor 5 is rotatably mounted between opposing arms 108 and 109 of holder 106, e.g., note its dotted position in FIG. 5, and clamped therebetween by any suitable means, e.g., a bolt 110, threaded through arms 108 and 109 into opposing complementary configured recesses 111 (FIG. 3) in the sensor body 6, and locked to the arms 108 and 109 with nuts 112. The sensor 5, is, preferably, angularly disposed to the welding surface. The sensor body 6, although clamped between the arms 108 and 109, will rotate upon encountering violent variations in the welding path or seam. This permits the follower 11 to override an overlapping weld, i.e., where the weld comes back on itself, as in the case of welding along a peripheral seam. In this manner the sensor is kept from being damaged. The boom can be equipped to pull away and shut itself off when such violent variations are encountered. A heat shield 114 may be provided to protect the sensor 5. A set screw 113 is provided as a safety stop to limit the rotation of the sensor body 6 in the direction of the welding head 97, and heat shield 114.

It may be found necessary to change or replace the sensor 5. In which case, the male plug or adapter 47 is detached from the female adapter. The nut 112 and bolt 110 are removed and the sensor 5 taken from the holder 106. A replacement is similarly mounted and clamped between arms 108 and 109. The male adapter 47 is plugged back into the female adapter 37 and the welding machine is ready to operate. In this manner the sensor 5 is easily removed and replaced.

Thus, a new and novel device for automatically controlling movement of the boom of a welding machine has been provided, whereby the welding head is guided along the seam or joint, and adjusted when variations in the seam are encountered.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A device for guiding a following piece of apparatus along a predetermined path, and for controlling the movement of such an apparatus when variations in the path are encountered, comprising:
    (a) a hollow elongated body;
    (b) an arm mounted within the body for rotation in at least two angularly disposed planes, one end of the arm extending beyond the body for contacting the path;
    (c) means coacting between the arm and body for mounting the arm to the body for rotation in the planes;
    (d) means coacting between the arm and body for biasing the extended arm end to a normal position in each of the planes of rotation said biasing means including:
        (1) a first spring disposed within the body adjacent the mounting means in biasing coaction with the arm for exerting pressure thereagainst in one direction when the arm is in normal operating position;
        (2) a pair of oppositely disposed second and third spring disposed in the body in spaced relation from the first spring and angularly disposed thereto, for biasing coaction with the arm to alternately exert pressure thereagainst in a direction which is angularly disposed to the direction of pressure exerted by the first spring; and
        (3) means disposed on the body for alternately coacting with the second and third springs for holding them in biasing coaction with the arm; and
    (e) means coacting with the other end of the arm and responsive to deviation of the arm from each of the planes, for maintaining the apparatus on the path.

2. The device of claim 1, wherein the planes of rotation are normal to each other.

3. In a welding machine having a boom, a welding head, and a wire fed from the head for welding engagement with a seam or joint to be welded; a sensor preceding the wire along the machine and controlling the movement of the boom to keep the wire in welding relationship with the seam when variations thereof are encountered, the sensor comprising:
    (a) an elongated body having a bore longitudinally extending through it;
    (b) an arm longitudinally extending through the bore and being pivotally mounted to the body intermediate the ends of the bore for rotation in at least two angularly disposed planes, one end of the arm being in contact with the seam;
    (c) means for pivotally mounting the arm to the body within the bore;
    (d) means disposed in the bore for biasing the seam following arm end to a normal position in each of the planes of rotation said biasing means including:
        (1) a first spring disposed within the body adjacent the mounting means in biasing coaction with the arm for exerting pressure thereagainst in one direction when the arm is in normal operating position;
        (2) a pair of oppositely disposed second and third springs disposed in the body in spaced relation from the first spring and angularly disposed thereto, for biasing coaction with the arm to alternately exert pressure thereagainst in a direction which is angularly disposed to the direction of pressure exerted by the first spring; and
        (3) means disposed on the body for alternately coacting with the second and third springs for holding them in biasing coaction with the arm; and
    (e) a plurality of switches disposed on the body in spaced relation from the mounting means for coaction with the other end of the arm when it rotates, the switches controlling the movement of the boom to compensate for such variations thereby keeping the wire in welding relationship with the seam.

4. The sensor of claim 3, wherein the second and third springs are disposed at right angles to the first spring for exerting pressure against the arm which is at right angles to the pressure exerted thereon by the first spring.

5. The sensor of claim 3, which includes a safety stop disposed on the body adjacent each limit switch for coaction with the arm when it rotates against the switch, for limiting the amount of force exerted against the switch whereby it is kept from being damaged.

6. The sensor of claim 3, wherein a pair of oppositely disposed limit switches are provided for each plane of rotation.

7. The sensor of claim 3, wherein the pivotal mounting means includes:
   (1) a cylinder mounted in the bore for rotation about an axis which is angularly disposed to the longitudinal axis of the bore, the cylinder having a slot extending therethrough; and
   (2) means for mounting the arm to the cylinder within the slot for rotation about an axis which is at right angles to the cylinder axis of rotation.

8. The sensor of claim 7, wherein the cylinder axis of rotation is at right angles to the bore axis.

9. In a welding machine having a boom, a welding head, and a wire fed from the head for welding engagement with a seam or joint to be welded; a sensor preceding the wire along the seam for controlling movement of the boom to keep the wire in welding relationship wtih the seam when variations thereof are encountered, comprising:
   (a) an elongated cylindrical body having an axially extending bore therethrough;
   (b) a cylinder mounted in the bore adjacent one end thereof for rotation about an axis which is at right angles to the longitudinal axis of the bore, the cylinder having a slot extending therethrough;
   (c) an arm extending through the bore and slot in the cylinder and mounted to the cylinder within the slot for rotation about an axis which is at right angles to the cylinder's axis of rotation;
   (d) a first spring disposed in the bore adjacent the rotating cylinder for biasing the arm in a predetermined fixed direction parallel to one rotational plane of the arm;
   (e) a second and third spring oppositely disposed in the bore in spaced relation from the first spring for alternately biasing the arm in a direction which is at right angles to the biasing action of the first spring and parallel to the other rotational plane of the arm;
   (f) a collar eccentrically mounted to the body for rotation therearound for alternately engaging the second and third springs and holding them in biasing coaction with the arm; and
   (g) two pairs of oppositely disposed limit switches disposed on the cylindrical body adjacent the other end of the arm for coaction therewith as the arm rotates, a pair of switches being in each plane of the rotating arm, and each switch designed to control movement of the boom in a predetermined direction whereby the wire is held in welding engagement with the joint or seam.

10. The sensor of claim 9, which includes a safety stop disposed on the body adjacent each limit switch for coaction with the arm as it rotates against the switch, for limiting the force exerted against the switch to keep the switch from being damaged.

11. The sensor of claim 10, wherein non-electrical conductive material is disposed on the arm end adjacent the switches for activating the switches as the arm rotates.

References Cited

UNITED STATES PATENTS

| | | | |
|---|---|---|---|
| 2,189,399 | 2/1940 | Lewbers | 219—124 |
| 2,670,423 | 2/1954 | Darner et al. | 219—124 |
| 2,839,663 | 6/1958 | McCollom | 219—125 |
| 3,072,779 | 1/1963 | Masters et al. | 219—125 |
| 3,158,121 | 11/1964 | Brems | 219—125 |
| 3,171,012 | 2/1965 | Morehead | 219—124 |
| 3,201,561 | 8/1965 | Damon | 219—125 |

RICHARD M. WOOD, *Primary Examiner.*

W. D. BROOKS, *Assistant Examiner.*